United States Patent [19]

Ohuchi

[11] Patent Number: 5,269,000
[45] Date of Patent: Dec. 7, 1993

[54] CURVE GENERATOR

[75] Inventor: Mitsurou Ohuchi, Tokyo, Japan

[73] Assignee: NEC Corporation, Tokyo, Japan

[21] Appl. No.: 640,964

[22] Filed: Jan. 14, 1991

[30] Foreign Application Priority Data

Jan. 12, 1990 [JP] Japan ..................... 2-5089

[51] Int. Cl.$^5$ .............................. G06F 15/62
[52] U.S. Cl. .................................. 395/142
[58] Field of Search ................. 395/141, 142

[56] References Cited

U.S. PATENT DOCUMENTS 4,631,690 12/1986 Corthout et al. ............ 395/121 X
5,134,688 7/1992 Corthout ........................ 395/142

FOREIGN PATENT DOCUMENTS 0349182 6/1989 European Pat. Off. .
0376317 12/1989 European Pat. Off. .

Primary Examiner—Mark K. Zimmerman
Attorney, Agent, or Firm—Whitham & Marhoefer

[57] ABSTRACT

A curve generator has a group of registers, a group of files, an operator, a comparator and a sequencer. The curve generator interpolates for a curve in the vicinity of a plurality of designated control points, for example, a Bezier curve or a Spline curve, by calculating coordinate values of middle points between the control points on the basis of coordinate values of said control points. The curve generator realizes, an exclusive hardware, from an algorithm for generating the curve and, therefore, is capable of generating the curve at extremely high speed.

3 Claims, 4 Drawing Sheets

| | CLOCK (TIME) → t | | | | | | |
|---|---|---|---|---|---|---|---|
| | 1 | 2 | 3 | 4 | 5 | 6 | 7 |
| REGISTER 1 | | a | | | | | a |
| REGISTER 2 | b | b s | | b | | | |
| REGISTER 3 | a | | a | s | | a | |
| REGISTER 4 | s | | | a | a | | |
| REGISTER FILE 5 | | | b | | | s | b |
| REGISTER FILE 6 | | | | | s | b | |
| REGISTER FILE 7 | | | s | | b | | |
| OPERATOR 9 | + | + | + | + | + | + | − | a: a-SIDE INPUT OF OPERATOR 9
b: b-SIDE INPUT OF OPERATOR 9
s: STORING PLACE

CURVE GENERATOR

BACKGROUND OF THE INVENTION

The present invention relates to a curve generator and, more particularly, to a curve generator which generates a free curve from a group of given control points in a graphic display which outputs characters or graphic figures to a CRT or a printer.

As for a typical graphics related apparatus which deals with characters or graphics, there have existed personal computers and EWS (Engineer Work Stations), and these have been widely used. Graphics which can be generally used in these apparatuses are based on straight lines or circular arcs, and complicated graphics are expressed by a combination of these. In such apparatus, therefore, hardware which can draw a straight line and a circular arc is included in order to improve performance thereof. However, there exist graphics, other than the straight line and the circular arc, which are also used frequently. One of them is a free curve, and the free curves called a Bezier curve and a Spline curve are frequently used. Each of these free curves can express a smooth curve and, therefore, is not only useful for CAD (Computer Aided Design) which can design various kinds of products with a computer but also is available for character expression named "outline font" which has been recently paid much attention.

The outline font means that a character is defined with coordinate values of terminal points on line segments which outline the character. In order to display or print the character, an inside area of the outline thereof is filled in. The outline of the character comprises a mixture of straight lines and curves. The curves are generally free curves rather than circular arcs. A curved portion of the outline can be approximated with short line segments, but this results in an extremely large number of line segments per character. The disadvantages therein are that the necessary information to define the character becomes huge and that, when the character is magnified, the quality thereof becomes poor because the curved portion thereof which is approximated with line segments appears as a group of straight lines. Therefore, a curve called a Bezier curve is generally employed for the outline font.

According to the Bezier curve method, when several control points are given, the smooth curve of a Bezier curve can be interpolated in the vicinity of the points. The curve frequently used is a 3rd-order Bezier curve. When four points are given as control points, the 3rd-order Bezier curve can not only be interpolated for the four points but also be an extremely smooth curve because, when a Bezier curve is newly drawn for four points consisting of one point newly given and three points out of the original four points excepting the start point thereof, the 1st- and 2nd-order differential coefficients of the first Bezier curve coincide with those of the second Bezier curve at a connecting point of both the curves. The free curve, as mentioned above, has the advantage in that the amount of information which defines a shape of the curve is small and in that, when the outline font of a character is magnified or reduced to be displayed or printed, the quality of the character does not deteriorate.

Next, an algorithm of generating Bezier curve will be explained. There has been generally known an algorithm which finds the curve by means of calculation from the start point thereof. In this case, however, the calculating speed is slow with a general purpose computer because numerous calculations of multiplication and division must be executed. Therefore, an algorithm which can be geometrically processed to find the curve is usually employed.

FIG. 1 is a coordinate diagram for the explanation of the geometrical algorithm which generates the 3rd-order Bezier curve. At first, of the arbitrary four points given as control points, middle points E, F and G of line segments Ab, BC and CD should be found. The middle point can be found with the calculation in which coordinate values of the control points on the line segment are added to each other and then, divided by two. Next, middle points H and I of line segments EF and FG should be found and then, a middle point J of a line segment HI should be found. This point J is on the 3rd-order Bezier curve. Next, when the process mentioned above is conducted for points A, E, H and J as control points, a next point Q on the curve is found. As explained above, after the point on the curve is found, the recursive process is repeatedly conducted for a new control point to find a next point on the curve.

When the process mentioned above is repeatedly conducted, the found point on the curve gradually and infinitely approaches the start point A. Therefore, it is necessary to stop the process when the found point substantially approaches the start point and to change the process in order to find a new point. In other words, when the distance between the point A and the found point Q on the curve, as shown in FIG. 1, is smaller than a predetermined value, the next control points should be J, I, G and D.

For generating the free curve mentioned above, there is a conventional apparatus in which, since it executes the process with software, the processing time is long. According to the conventional apparatus, it is necessary for a general purpose computer to execute the processes of several hundred clock pulses in order to find one point on the curve. In order to find an X coordinate value of a middle point, two-time loadings of data, one addition, one shifting (that is, division by two) and one storing need be processed. In order to find X coordinate values and Y coordinate values of 6 points, therefore, there are needed operations including at least 60 steps. In order to execute the instruction of one step, it takes 4 clock period because fetching the instruction, reading an operand, executing operation and storing its result are required. This results in the need of several hundred clock pulses to find one point on the curve. Moreover, there are needed the processes, for example, in which the distance between the control point and the point on the curve is calculated to be compared with the predetermined value, and in which data are exchanged when the distance is smaller than the predetermined value, so that the processing speed becomes slower.

SUMMARY OF THE INVENTION

It is, therefore, an object of the present invention to overcome the problems existing in the conventional arrangement and to provide an improved curve generator.

It is another object of the present invention to provide a curve generator which can generate a free curve at a high speed.

It is a further object of the present invention to provide a curve generator which realizes in an exclusive hardware the processing of an algorithm of generating the curve.

In carrying out the above and other objects of the present invention in one form, there is provided an improved curve generator which interpolates for a curve in the vicinity of a plurality of designated control points by calculating coordinate values of middle points between said control points on the basis of coordinate values of said control points, comprising:

a first storage means which, after said plurality of control points and said middle points having been divided into two groups, stores one group of said coordinate values of said plurality of control points and said middle points;

a second storage means which stores the other group of said coordinate values of said middle points and has a pointer executing an address control;

an operation means which calculates coordinate values of a middle point between predetermined two points whose coordinate values are stored in at least one of said first and second storage means, and causes said calculated coordinate values of said middle point to be stored in one of said first and second storage means;

a comparator which calculates a distance between said control points and compares said distance with a predetermined value; and a means receiving an output of said comparator which means increases said pointer when said distance is larger than said predetermined value, transfers coordinate values read from said second storage means to said first storage means and also decreases said pointer when said distance is smaller than said value.

According to the present invention, said first and second storage means may comprise one or more registers, register files or RAMs.

PREFERRED EMBODIMENTS OF THE INVENTION

Throughout the following explanation, similar reference symbols or numerals refer to the same or similar elements in all the figures of the drawings.

Now, the embodiments of the present invention will be described in detail with reference to FIGS. 2 through 5.

Figure 2:
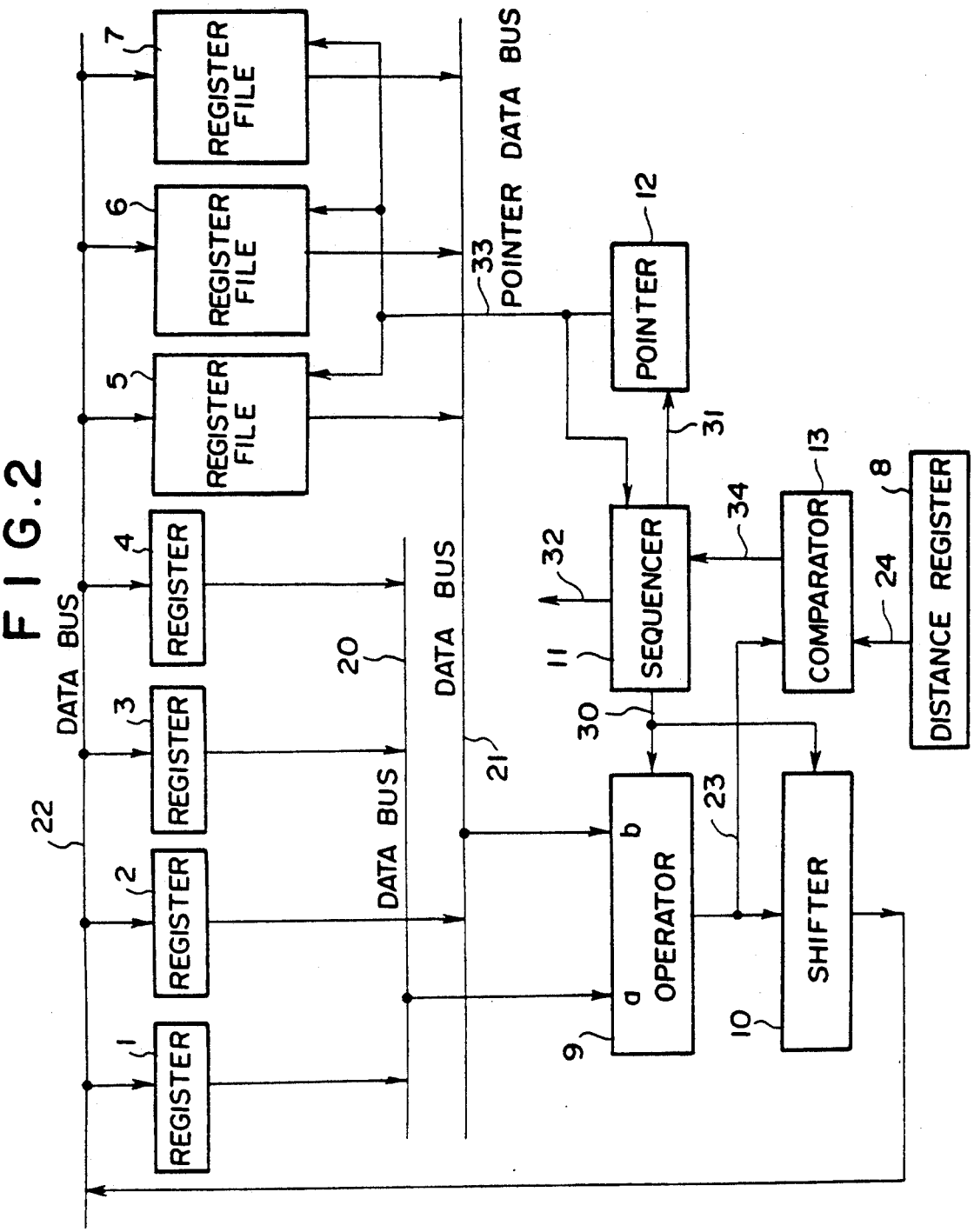
FIG. 2 shows a block diagram of a curve generator as a first embodiment according to the present invention.

FIG. 2 shows a block diagram of a curve generator as a first embodiment according to the present invention. The curve generator includes registers 1-4, register files 5-7, a distance register 8, an operator 9, a shifter 10, a sequencer 11, a pointer 12, and a comparator 13 with the elements concerned being connected through data buses 20-24 and 33. The signals involved include an operation control signal 30, a pointer control signal 31, a register control signal 32, and a comparison signal 34.

According to the first embodiment of the present invention, coordinate values of 4 points are inputted thereto and, then, the point on the third-order Bezier curve near a starting point is found. The sampling of the curve continues until both an X coordinate value between neighboring points and a Y coordinate value therebetween in a coordination system become smaller than predetermined values. A coordinate value is expressed with a 16-bit fixed point and both the X coordinate value and the Y coordinate value are processed in combination so that the register, register file, data bus, operator and so on have a word length of 32 bits respectively. The operator 9 and shifter 10 respectively comprise two parts each of which has a word length of 16 bits and is used for the X coordinate value or the Y coordinate value, but output their operation results in combination with the coordinates so that output signals thereof have a word length of 32 bits. In short, the process of the X coordinate value and that of the Y coordinate value are independent of each other, but the sequences of both the processes are at the same time so that the results of the processes can be combined with each other by means of hardware.

The realization of the hardware depends on the characteristics that:

(i) loading of the coordinate values, adding, shifting and storing of the results can be conducted during one clock period;

(ii) the X coordinate value and the Y coordinate value can be processed in individual operators at the same time;

(iii) the distance between control points is determined on the basis of the differences between X coordinate values of the points and between Y coordinate values thereof;

(iv) all sequences of the processes are controlled by the hardware so that a fetch cycle of instruction code is not required; and (v) the processes can be conducted cyclically by means of the hardware which calculates for finding one point on the curve.

According to the hardware having the characteristics mentioned above, it is possible to find one point on the curve during a run time of 7 clock period and to gain the performance thereof which is several tens of times compared with that of the conventional curve generator in which the processes are conducted by software.

According to the present invention, in order to realize the characteristic (v) especially, the hardware is so designed that the sequence thereof becomes simple. There is provided storage means in which the control points and new control points generated from the middle points found among the control points are divided into two groups and are stored, so that it is possible to exchange the group of control points easily when the distance between the generated control point and the neighboring point falls within the predetermined value.

Figure 4A:
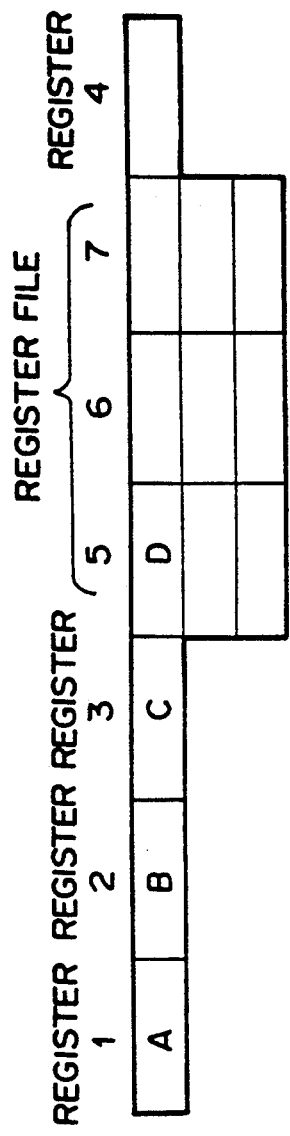
FIGS. 4(a) to 4(e) are diagrams for explaining the contents of registers in the curve generator of the present invention shown in FIG. 2.
Figure 4B:
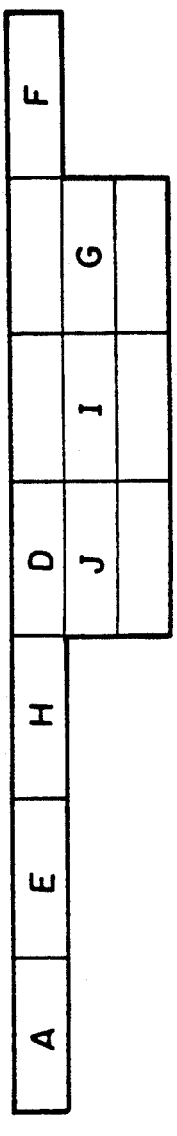
Figure 4C:
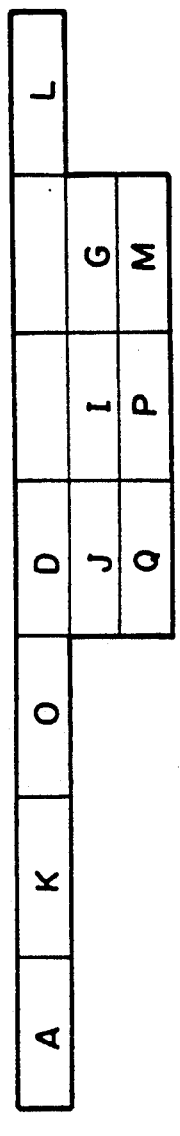
Figure 4D:
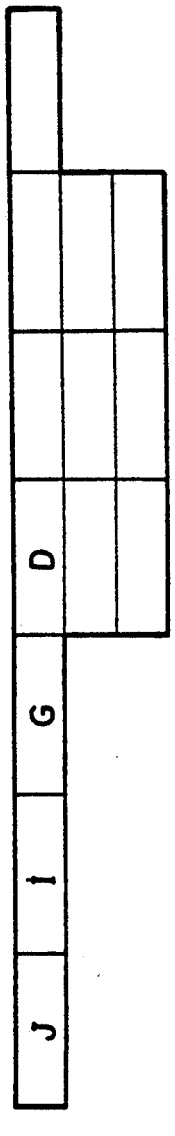
Figure 4E:
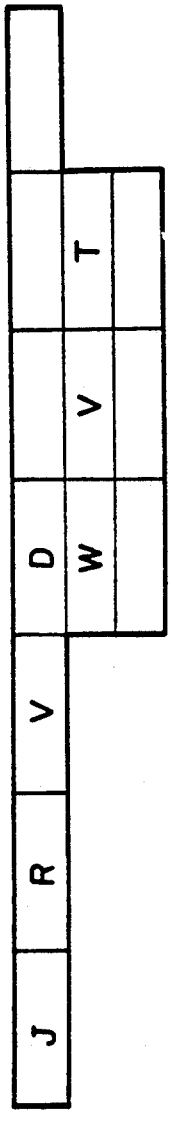

Now, the contents of the registers will be explained with reference to FIG. 4. FIG. 4(a) illustrates the initial state of the contents thereof. The coordinate values of a first control point (a start point of the curve, for example, the point A shown in FIG. 1), a second control point (for example, the point B shown in the figure), a third control point (for example, the point C shown there-in) and a fourth control point (an end point of the curve, for example, the point D shown therein) are set to the registers 1, 2, 3 and the address 0 of the register file 5. This setting is conducted by the control from an external unit. FIGS. 4(b) through 4(e) illustrate alterations in the contents of the registers and register files. FIG. 4(b) illustrates the contents at the time when the point J on the curve is calculated. The coordinate values of the found middle points J, I and G are stored in the addresses 1 of register files 5-7. The registers 2-4 erase the former contents and store the contents of the points E, H and F. FIG. 4(c) illustrates the result of new calculation based on 4 control points of the registers 1-3 and the address 1 of the register file 5. The process from FIGS. 4(b) to 4(c) is similar to that from FIGS. 4(a) to 4(b) except that each pointer of the registers increases by one. FIG. 4(d) illustrates an alteration in the contents of the registers and register files when the distance between the point Q on the curve found at the stage shown in FIG. 4(c) and the start point A becomes smaller than the predetermined value. The contents stored in the register files 5-7 at the stage shown in FIG. 4(c) are transferred to the registers 1-3 respectively and each pointer of the register files 5-7 decreases by one. This state is similar to the initial state shown in FIG. 4(a). FIG. 4(e) illustrates the state where the point on the curve is found from calculation on the basis of data shown in FIG. 4(d), and the process ends when the calculated distance becomes smaller than the predetermined value. In other words, when the pointer is in the state of "0" and the distance is smaller than the predetermined value, process for all points to be found terminates.

Figures 1, 3:
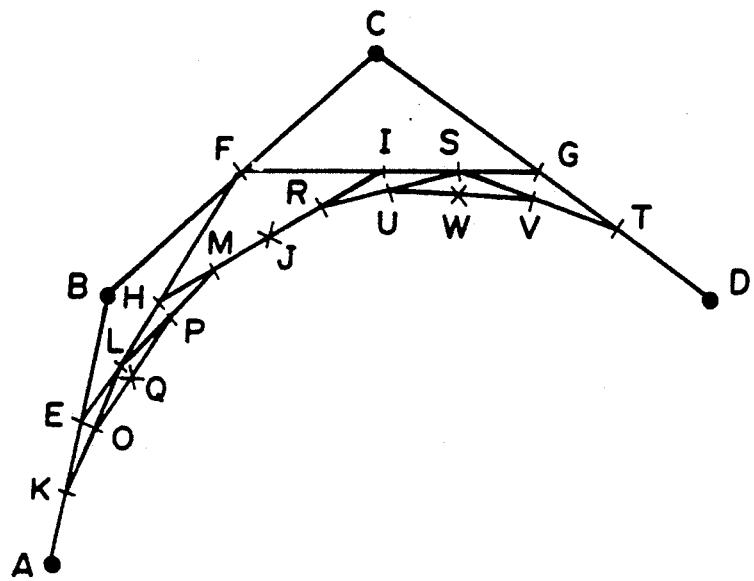
FIG. 1 is a coordinate diagram for the explanation of an algorithm which generates a general Bezier curve.
FIG. 3 is a timing chart illustrating the operation of the curve generator of the present invention shown in FIG. 2.

Next, the timing of operations in the curve generator according to the present invention will be described with reference to FIG. 3. This figure illustrates input selection of the registers 1-4 and register files 5-7, and illustrates storage location of the operation results. As shown in this figure, one point on the curve is calculated during the run time of 7 clock signals. The sequence of the calculation is controlled by means of the sequencer 11. At first, the content of the register 2 is inputted to a b-side input terminal of the operator 9 and the content of the register 3 is inputted to an a-side input terminal thereof, and its result is stored in the register 4. Next, the contents of the registers 1 and 2 are respectively inputted to the a-side and b-side input terminals of the operator 9, and its result is stored in the register 2. The same process applies correspondingly to the following so that each of the middle points shown in FIG. 1 is calculated. The coordinate values of the point on the curve are stored in the register file 5 at the time of the 6th clock signal. At the cycle of 7th clock signal, the distance between the start point on the curve (stored in the register 1) and the calculated point thereon (stored in the register file 5) is calculated and the result of comparison between the distance and the predetermined value is outputted.

The configuration of the hardware which conducts the operation described above will now be explained. The registers 1-4 and the register files 5-7 are connected, through the data bus 20 or 21, to the a-side and b-side input terminals of the operator 9, and the operation results are stored, through the shifter 10 and the data bus 22, in the registers and registers files.

The sequencer 11 controls a total process sequence, namely, executes a control flow of the process basically shown in FIG. 4. In order to execute this flow, sequencer 11 generates, as a control signal 32, a control signal which selects a register or a register file having data inputted to the operator 9, or a control signal which selects a register or register file to store an operation result, and outputs, as a control signal 30, a signal which selects the kind of operations to be executed in the operator 9. The sequencer 11, moreover, changes process according to the result from comparison of the distance. In the comparator 13, the X coordinate value and the Y coordinate value of the content in the distance register 8 are independently compared with those of the output content from the operator 9. When at least one of the X coordinate value and the Y coordinate value of the content in the distance register 8 is smaller than those of the output contents therefrom, the comparison signal 34 is inactive so that sequencer 11 resumes the flow shown in FIG. 1. On the contrary, when both the X coordinate value and the Y coordinate value of the content in the distance register 8 are larger than those of the output contents, the comparison signal 34 becomes active. This means that the contents of the register files 5-7 are transferred, through the operator 9 and shifter 10 without any data processing, on the data bus 22 to the registers 1-3. The transfer, therefore, finishes during a run time of 3 clock signals. The comparator 13 includes the function which, in the case of a value of the operation output being negative value, changes it into the absolute value.

Now, the pointer control on register files which is conducted in the pointer 12 will be explained hereinafter. There exist pointers for read and write, and initial values of the read pointer and the write pointer are respectively "0" and "1". These values of the read and write pointers are outputted through the pointer data bus 33 to register files 5-7. The timing for update of the pointer 12 is as follows. At first, when the comparison signal 34 is inactive in the result of the distance comparison, both the read pointer and the write pointer increase by one (+1). On the contrary, when the comparison signal 34 is active, the contents of the register files 5-7 are transferred to registers 1-3 and, then, both the read pointer and write pointer decrease by one (−1).

The sequencer 11 determines termination of the process. The condition of the termination is that the comparison signal 34 is active and the read pointer is "0". When this condition is satisfied, the sequencer 11 halts.

As for gradation of the hardware, a work memory of several ten words, two operators, a sequencer, pointers and so on are necessary for the hardware so that the hardware can be fabricated with low cost by means of recent LSI technology. Necessary capacity of the work memory is found in the following way. When a Bezier curve is drawn from the left end to the right end on the frame memory having resolution of 1024×1024, calculations for finding the middle points are conducted ten times and, then, the coordinate values of the point on the curve next to the left end point thereon can be found because 1024 is equal to $2^{10}$. In this resolution, therefore, it is sufficient for the work memory to store the coordinate values of ten middle points. In this resolution, moreover, when precision is 10 bits for the integer part of data and also 10 bits for the decimal part thereof, namely, 20-bit fixed point, calculation can be done without any error. However, since an error below the decimal point can be ignored to a certain degree, the precision of 16-bit fixed point is still bearable for practical use.

Figure 5:
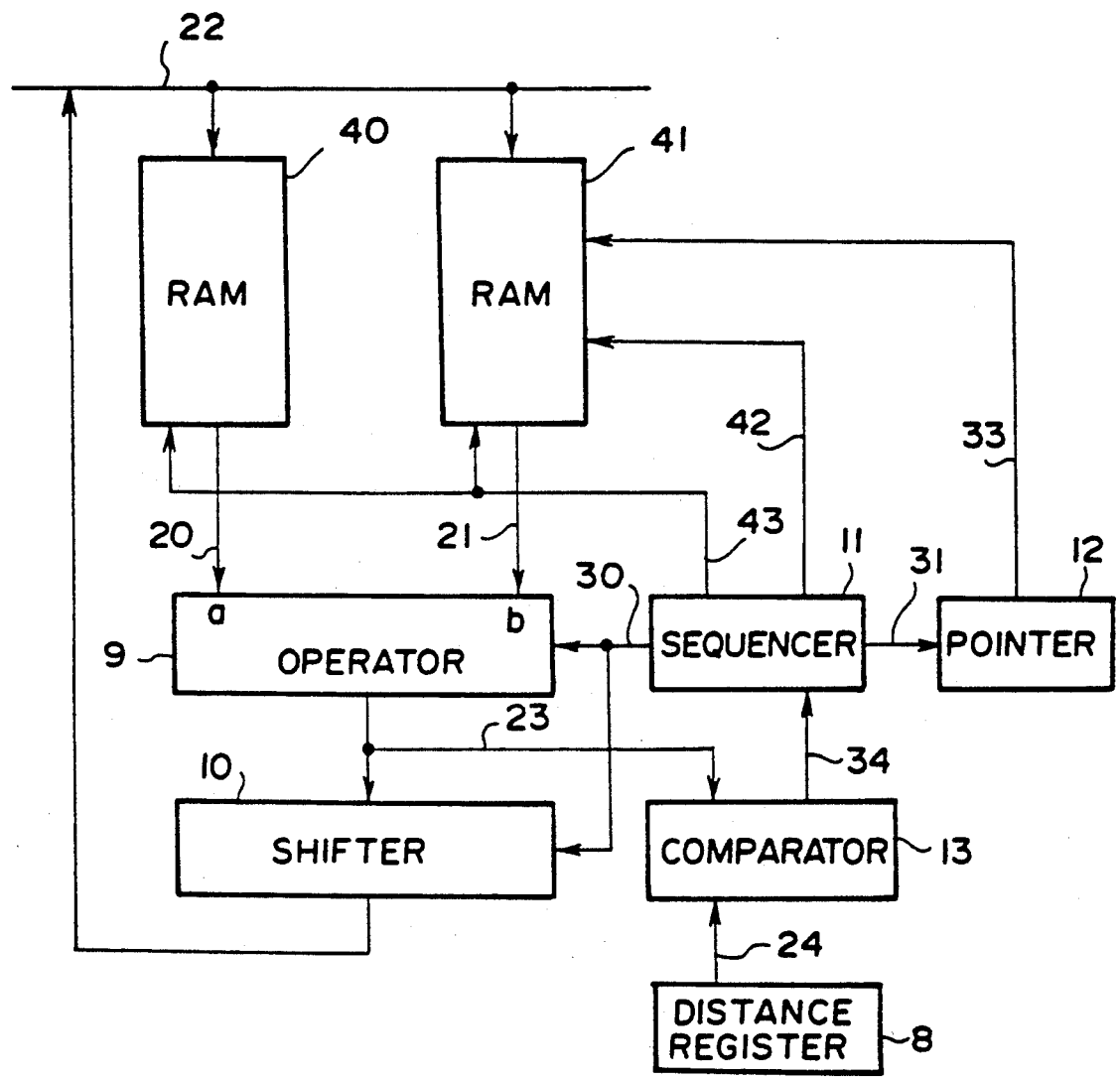
FIG. 5 shows a block diagram of a curve generator as a second embodiment according to the present invention.

FIG. 5 shows a block diagram of a second embodiment according to the present invention. In this embodiment, in order to integrate the registers and register files used in the first embodiment and to reduce the cost, RAM (random access memory) is employed in the hardware. Because the necessary area for a RAM configuration is smaller than that for a group of separate registers as a storage element having the same capacity, the cost of the data storage portion can be largely reduced. However, because a plurality of elements are integrated in the same memory, the control to fetch a content of each element should be altered to some extent. The difference between this embodiment and the first one resides in an access control on the RAM, so that only this difference will be explained hereinafter.

FIG. 5 illustrates RAMs 40 and 41, a base pointer bus 42, a control signal 43 of RAM, a distance register 8, an operator 9, a sequencer 11, a pointer 12, a comparator 13, data buses 20-24, an operation signal 30, a pointer control signal 31, a pointer data bus 33 and a comparison signal 34.

The RAM 40 corresponds to the combination of registers 1, 3, 4 shown in FIG. 2. As for an input to the a-side input terminal of the operator 9 in the first embodiment, the sequencer 11 outputs the individual selection signal as the register control signal 32 to the registers. But, the sequencer 11 of the second embodiment employs an address control by having RAM configuration applied. Namely, the sequencer 11 outputs a RAM address as a RAM control signal in stead of the register control signal.

On the other hand, the control on the RAM 41 which gives an input to the b-side input terminal of the operator 9 is different from that on the RAM 40 to a certain extent. The combination of a pointer generated by the pointer 12 and a base pointer outputted by the sequencer 11 is used for an address of the RAM 41. Therefore, an address of 6 bits which comprises both pointer information of 4 bits through the pointer data bus 33 and base pointer information of 2 bits outputted through base pointer bus 42, is inputted to the RAM 41.

In the second embodiment, coordinate values are dealt with by means of 16-bit fixed point. However, the present invention is not limited to this bit point. According to the present invention, the process can also be conducted with high speed in the case of the curve other than 3rd-order Bezier curve if that curve is generated on the basis of calculation of middle points. The difference between a case of a 2nd- , 4th- or higher-order Bezier curve, for example, and that of the 3rd-order curve is only the number of middle points to be found with calculation. In Spline curve, it is known that this curve can be approximated to Bezier curve by means of a pre-process which converts a given control point on a Spline curve into that on a Bezier curve. Therefore, the present invention can also be applied to the such Spline curves.

As for the storage domain in which control points and middle points are stored, the domain to a plurality of registers as explained in the first embodiment may be spread or a signal memory with the pointer control as shown in the second embodiment may be used. In any case, the present invention brings about the advantage in that alteration of control points can be conducted easily and the sequence of process becomes simpler.

As mentioned above, the present invention has the advantages in that it is possible to obtain the processing speed ten times faster than the speed of process conducted by software and to obtain the cost reduction because of simple configuration in the hardware.

While the present invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A curve generator which interpolates for a curve in a vicinity of a plurality of designated control points by calculating coordinate values of middle points between said control points in accordance with coordinate values of said control points, comprising:
    a first storage means which, after said plurality of control points and said middle points having been divided into two groups, stores one group of said coordinate values of plurality of control points and said middle points;
    a second storage means which stores the other group of said coordinate values of said middle points;
    a pointer which is connected to said second storage means and controls address thereof;
    an operation means which calculates coordinate values of middle points between predetermined respective two points whose coordinate values are being stored in said first storage means and said second storage means, and causes said calculated coordinate values of said middle points to be stored in one of said first storage means and said second storage means;
    a comparator which calculates a distance between one of said control points and one of said middle points or one of said middle points and another of said middle points and compares said distance with a predetermined value; and
    a sequencer which receives an output of said comparator and increases said pointer when said distance is larger than said predetermined value and decreases said pointer if said distance is smaller than said predetermined value, said sequencer transferring those coordinate values that are read from said second storage means and that had been stored in said addresses of said second storage means before said pointer was decreased to said first storage means.

2. A curve generator according to claim 1, in which said first storage means comprises a plurality of registers and said second storage means comprises a plurality of register files.

3. A curve generator according to claim 1, in which each of said first storage means and said second storage means comprises a random access memory.

* * * * *